United States Patent [19]
Fujita

[11] Patent Number: 5,974,083
[45] Date of Patent: Oct. 26, 1999

[54] SPREAD SPECTRUM SIGNAL RECEPTION APPARATUS

[75] Inventor: Takao Fujita, Fujisawa, Japan

[73] Assignee: Canon Kabushiki Kaisha, Tokyo, Japan

[21] Appl. No.: 08/451,764

[22] Filed: May 26, 1995

[30] Foreign Application Priority Data

Jun. 3, 1994 [JP] Japan .................................. 6-145703

[51] Int. Cl.$^6$ .......................... H04L 27/30; H04L 27/08; H04K 1/00
[52] U.S. Cl. .......................... 375/208; 375/206; 375/345; 455/245.1
[58] Field of Search ................................... 375/208, 205, 375/200, 345, 206; 370/18, 441, 509, 335, 342; 455/245.1

[56] References Cited

U.S. PATENT DOCUMENTS

| | | | |
|---|---|---|---|
| 4,884,284 | 11/1989 | Nakayama | 375/208 |
| 4,958,359 | 9/1990 | Kato | 375/1 |
| 4,984,247 | 1/1991 | Kaufmann et al. | 375/200 |
| 5,132,985 | 7/1992 | Hashimoto et al. | 375/200 |
| 5,138,632 | 8/1992 | Uchida | 375/343 |
| 5,218,620 | 6/1993 | Mori et al. | 375/206 |
| 5,347,537 | 9/1994 | Mori et al. | 375/208 |
| 5,351,269 | 9/1994 | Schilling | 375/200 |
| 5,410,568 | 4/1995 | Schilling | 375/206 |
| 5,457,813 | 10/1995 | Poutanen | 375/345 |
| 5,537,396 | 7/1996 | Kanda et al. | 370/18 |
| 5,574,747 | 11/1996 | Lomp | 375/200 |
| 5,644,590 | 7/1997 | Sugita | 375/200 |

FOREIGN PATENT DOCUMENTS 5122192  5/1993  Japan .

*Primary Examiner*—Stephen Chin
*Assistant Examiner*—Betsy L. Deppe
*Attorney, Agent, or Firm*—Fitzpatrick Cella Harper & Scinto

[57] ABSTRACT

The present invention relates to a spread spectrum signal reception apparatus for receiving a code division multiplex signal, and for receiving a spread spectrum signal for synchronization previous to the code division multiplex signal. The reception apparatus detection means for detecting a reception level of the spread spectrum signal for synchronization previous to the code division multiplex signal, and adjustment means for adjusting a level of the code division multiplex signal in accordance with the reception level detected by the detection means.

20 Claims, 4 Drawing Sheets

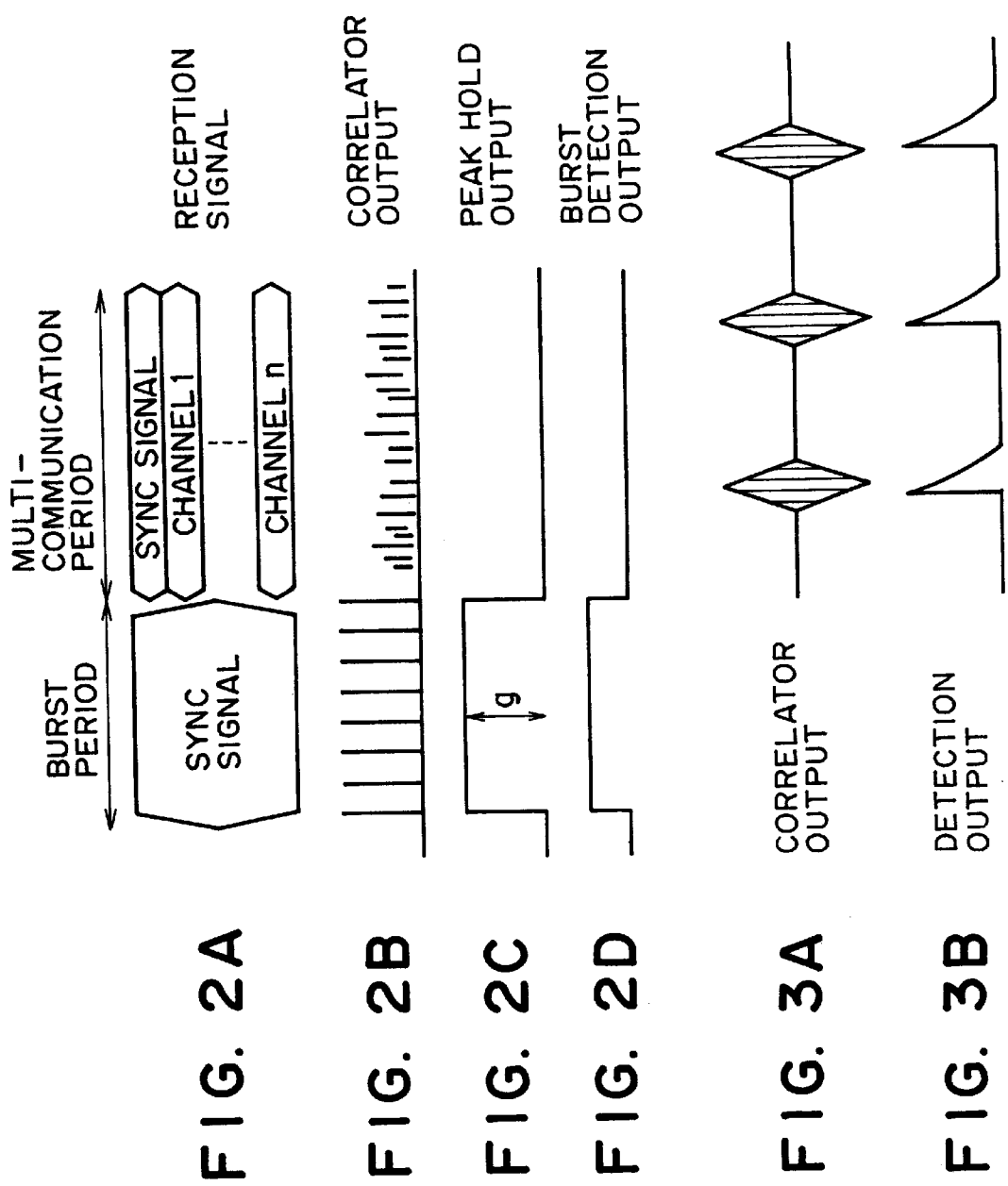

SPREAD SPECTRUM SIGNAL RECEPTION APPARATUS

BACKGROUND OF THE INVENTION

1. Field of the Invention

The present invention relates to a spread spectrum signal reception apparatus for receiving the code division multiplex signal.

2. Related Background Art

The present applicant proposed a spread spectrum signal reception apparatus which controls the amplifying ratio of an amplifier, in Japanese Patent Application No. 3-304005 (Japanese Patent Application Laid-Open No. 5-122192), by utilizing the peak of a correlator output as an automatic gain control (AGC) voltage.

The constitution of a reception apparatus explained in Japanese Patent Application Laid-Open No. 5-122192 is shown in FIGS. 4 and 5.

Next, an operation of the circuit shown in FIG. 4 will be explained.

A convolver output detected by a detector 41 is further detected of its peak value by a peak level detector 22.

An output of a detector 41 is input to a noise level detector 23 and the noise level is detected by this noise level detector 23. A noise level detector 23 interrupts only the regular peak portion of a convolver output and detects the peak of another portion.

Then, the difference between the peak level and the noise level is detected by a difference detector 24. This difference corresponds to the ratio of the convolver output signal to the noise. When this difference voltage becomes higher, the S/N ratio of a convolver output is improved. Accordingly, gains of two variable amplifiers 13 and 19 are controlled to become the appropriate value respectively from a control voltage generator 25 so that this difference voltage becomes a certain predetermined value $V_0$. Accordingly, the S/N ratio of a convolver output can be held at the best condition irrespective of variation of the reception wave level, with maintaining the output voltage of a difference detector 24 at the previously set value $V_0$. It should be noted that a first local oscillator may be controlled instead of an amplifier 13.

Next, an operation of the circuit shown in FIG. 5 will be explained.

The correlation output of a convolver 14 has the known output interval $t_1$ given with the transference rate of information to be transferred. Also, the width $t_2$ of the correlation output is already known. The correlation output is sent to a detector 41 through a high frequency switch 33 and further sent to a code synchronization unit.

In case where the code is synchronized by detecting the peak of the most large correlation output depending on an envelope detection, if a correlation output of the delay wave component depended on the multi-pass is observed, it becomes difficult to synchronize the code because the peak interval is deviated due to the delay wave.

Accordingly, in a circuit shown in FIG. 5, a high frequency switch 33 is switched responding to the interval of a correlation output depended on a desired wave component to eliminate the correlation output component due to the delay wave.

When the switch signal of a switch signal generator 34 is on-state, a high frequency switch 33 becomes through-state and the correlation output is sent to a detector 41. That is, when the switch signal is off-state, a high frequency switch 33 acts as an attenuator to attenuate the correlation output, and when the switch signal is on-state, a high frequency switch 33 becomes through-state to conduct the correlation output to the detector 41 side.

Accordingly, the correlation output eliminated delay wave component can be obtained by fitting the cycle of the switch from a generator 34 to the interval $t_1$ of the above correlation output, and fitting the on-timing of the switch signal to the timing of the desired wave, further by setting the on-pulse width $t_3$ of the switch signal narrower than the width $t_2$ of the above correlation output ($t_3 < t_2$).

The switch signal from a generator 34 is maintained at the on-state until the initial correlation output is obtained after the power is turned on. Due to this fact, the initial correlation output is sent to a detector 41 and the detection output is input to a timer circuit 35. According to this, a timer circuit 35 is operated and the timer output is switched from an off-state to an on-state with the timing ($t_m$) responded to the interval $t_1$ of the above correlation output to turn on the switch signal of a switch signal generator 34. Then, from the second correlation output, the switch signal is ON/OFF controlled in response to the interval $t_1$ of the correlation output by the own operation of a timer circuit 35. That is, the on-pulse width $t_3$ and the off-pulse width ($t_1 - t_3$) are set together with the initial off-time $t_m$ in a time circuit 35.

However, in a burst synchronization system, if the AGC is utilized, the ratio for an input level of the correlator output for extracting the synchronization signal is greatly changed between the burst synchronization period and the multiplex demodulation period subsequently followed, and the AGC output level does not become a constant level. Therefore, an operation point is greatly changed in a later stage, so that the circuit design becomes difficult.

During the multiplex demodulation period, it is difficult to realize the accurate AGC by only the synchronization signal in a correlator output because of the influence of interference due to the mutual correlator of channels other than synchronization signal channel.

SUMMARY OF THE INVENTION

It is an object of the present invention to control the reception power accurately.

It is another object of the present invention to receive code division multiplex signal accurately in case of receiving the spread spectrum signal for synchronization previous to the code division multiplex signal.

Another object of the present invention will simplify the circuit used for accurately receiving the code division multiplex signal.

Other objects of the present invention will be apparent from the following embodiments.

BRIEF DESCRIPTION OF THE DRAWINGS

FIGS. 2A to 2D are timing charts showing wave forms of each section according to the above embodiment;

FIGS. 3A and 3B are timing charts showing the relationship between the correlator output and the detection output.

DETAILED DESCRIPTION OF THE PREFERRED EMBODIMENTS

Figure 1:
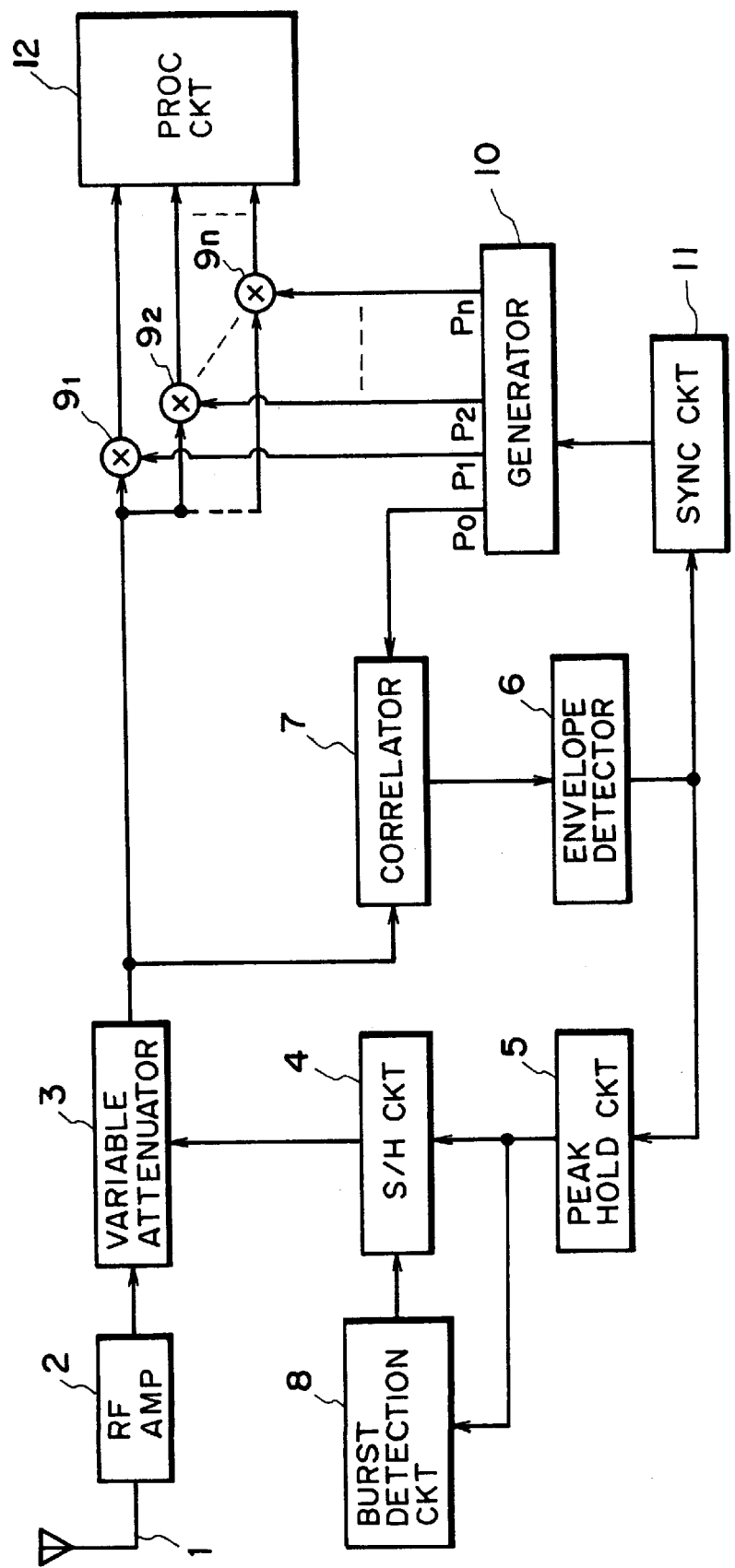
FIG. 1 is a block diagram showing an embodiment of the present invention.
Figure 4:
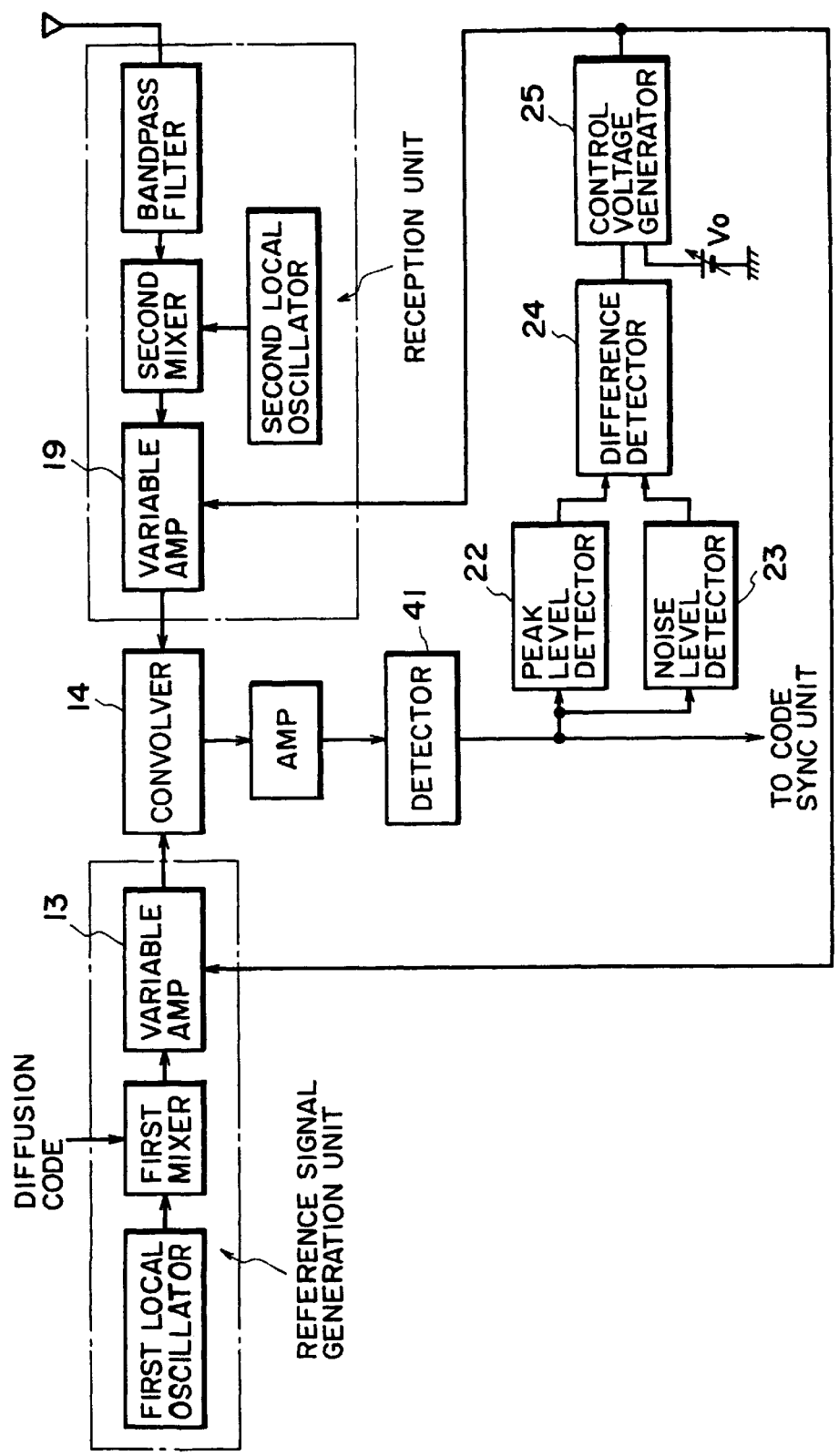
FIGS. 4 and 5 are block diagrams showing the prior embodiments.
Figure 5:
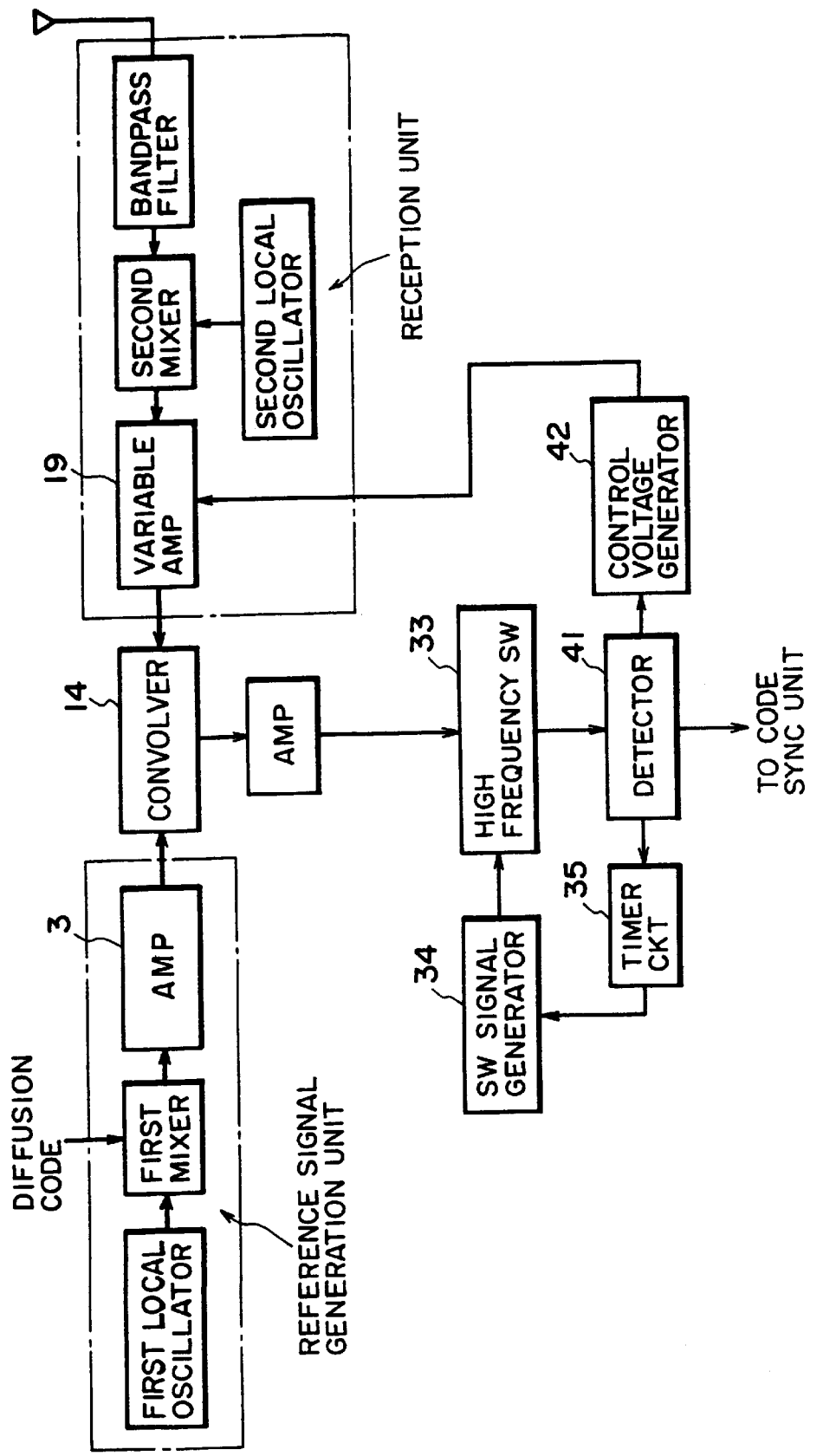

FIG. 1 is a block diagram showing an embodiment of the present invention.

A spread spectrum reception apparatus of this embodiment comprises a reception antenna 1, an amplifier (RFAMP) 2 for amplifying the signal which is input from this antenna 1, a variable attenuator 3 for varying the output level in accordance with the signal from a sample-and-hold circuit 4, a correlator 7 for outputting the correlation wherein an output from this variable attenuator 3 and the reference spread signal $P_0$ are treated as the input, an envelope detector 6 which treats this correlation output as an input, a peak hold circuit 5 which treats an output from this envelope detector 6 as an input, a detection circuit 8 which treats an output from this peak hold circuit 5 as an input and detects the burst period, a sample-and-hold circuit 4 for holding the level of period detected by a burst detection circuit 8 among outputs of a peak hold circuit 5, multipliers $9_1$ to $9_n$ for inversely diffusing an output of a variable attenuator 3, a generator 10 for generating the reference diffusion signal $P_0$ and inverse diffusion signals $P_1$ to $P_n$, a synchronization circuit 11 for synchronizing the transmission side with the reception side based on an output of a correlator 7, and a process circuit 12 for processing the reception signal.

As shown in the drawing, during the burst period, only the synchronization signal is transferred with all power. During the subsequently continued multiplex communication period or multiplex modulation period, the synchronization signal and plural channels are multiplexed and transferred.

Then, this signal becomes an input of the multiplier 9 through a variable attenuator 3 and is input to a correlator 7 simultaneously. A correlator 7 correlates this signal with the reference diffusion signal which becomes another input so as to output thus signal. Since this output becomes the signal having the envelope synchronized with the clock sent from a transmitter (shown in FIG. 3A), this output is envelope detected by an envelope detector 6 (FIG. 3B).

This signal is made into the signal shown in FIG. 2C in a peak hold circuit 5. The level g during the burst period has the proportional relationship with the input signal level. While, the time of the burst period is detected in burst detection circuit 8 based on the peak of a correlator 7 greater than a predetermined value, accordingly, a sample-and-hold circuit 4 is controlled. Therefore, a sample-and-hold circuit 4 outputs the level g during the burst period until the next burst is generated. The attenuate ratio of a variable attenuator 3 is determined in accordance with this level g.

It should be noted that a burst detection circuit 8 may hold an output of a peak hold circuit 5 by a sample-and-hold circuit 4 if the peak of an output from a correlator 7 is stabilized within the predetermined range.

A variable attenuator 3 outputs the reception signal during the multiplex modulation period with the attenuate ratio responded to this level g. Multipliers $9_1$ to $9_n$ inversely diffuse reception signals of channels 1 to n by multiplying outputs from the variable attenuator by inverse diffusion signals $P_1$ to $P_n$.

As explained above, the present invention is described based on the preferred embodiment. However, the present invention is not limited to the constitution of the above embodiment, so that various modifications are possible within the spirit and scope of the appended claims of the invention.

What is claimed is:

1. A reception apparatus for receiving a spread spectrum signal, a number of channels of the spread spectrum signal being changed during reception from a first channel to a plurality of channels, comprising:

detection means for detecting a reception level of the spread spectrum signal for the first channel before the number of channels is changed; and adjusting means for adjusting the reception level of the spread spectrum signal for the plurality of channels after the number of channels is changed, in accordance with the detected reception level of the spread spectrum signal for the first channel.

2. An apparatus according to claim 1, wherein said detection means has correlating means for correlating the reception signal for the first channel with a reference spread spectrum signal, the reception level of the spread spectrum signal for the first channel being detected based on an output of said correlating means.

3. An apparatus according to claim 1, further comprising means for de-spreading each of the plurality of channels of the level-adjusted spread spectrum signal.

4. An apparatus according to claim 1, wherein said adjusting means has holding means for holding the detected reception level of the spread spectrum for the first channel during reception of the spread spectrum signal for the plurality of channels.

5. A method of adjusting a level of a spread spectrum signal, a number of channels of the spread spectrum signal being changed during reception from a first channel to a plurality of channels, comprising the steps of:

detecting a reception level of the spread spectrum signal for the first channel before the number of channels is changed; and adjusting the level of the spread spectrum signal for the plurality of channels after the number of channels is changed, in accordance with the detected reception level of the spread spectrum signal for the first channel.

6. A method according to claim 5, wherein the reception level is detected in said detecting step based on a correlation between the spread spectrum signal for the first channel and a reference spread spectrum signal.

7. A method according to claim 5, further comprising the step of de-spreading each of the plurality of channels of the level-adjusted spread spectrum signal.

8. A method according to claim 5, wherein the reception level of the spread spectrum signal detected for the first channel is held during reception of the spread spectrum signal for the plurality of channels.

9. A reception apparatus for receiving a single-channel spread spectrum signal and a multi-channel spread spectrum signal, comprising:

detection means for detecting a reception level of the single-channel spread spectrum signal; and adjusting means for adjusting a reception level of the multi-channel spread spectrum signal in accordance with the reception level of the single-channel spread spectrum signal detected by said detection means.

10. An apparatus according to claim 9, wherein said detection means includes a correlating means for correlating the single-channel spread spectrum signal with a reference spread spectrum signal, and the reception level of the single-channel spread spectrum signal is detected based on an output of said correlating means.

11. An apparatus according to claim 9, further comprising de-spreading means for de-spreading each channel of the multi-channel spread spectrum signal based on the level-adjusted multi-channel spread spectrum signal.

12. An apparatus according to claim 9, wherein said adjusting means includes a holding means for holding the reception level of the single-channel spread spectrum signal during reception of the multi-channel spread spectrum signal.

13. An apparatus according to claim 11, further comprising synchronizing means for synchronizing said de-spreading means and the single-channel spread spectrum signal.

14. A method of adjusting a level of a multi-channel spread spectrum signal which is received after a single-channel spread spectrum signal, comprising the steps of:

detecting a level of the single-channel spread spectrum signal; and adjusting a level of the multi-channel spread spectrum signal in accordance with the level of the single-channel spread spectrum signal detected in said detection step.

15. A method according to claim 14, wherein the level of the single-channel spread spectrum signal is detected in said detection step based on a correlation of the single-channel spread spectrum signal and a reference spread spectrum signal.

16. A method according to claim 14, further comprising the step of de-spreading each channel of the multi-channel spread spectrum signal based on the level-adjusted multi-channel spread spectrum signal.

17. A method according to claim 14, wherein the level of the single-channel spread spectrum signal detected in said detecting step is held during reception of the multi-channel spread spectrum signal.

18. A method according to claim 16, further comprising the step of synchronizing the de-spreading of said de-spreading step and the single-channel spread spectrum signal.

19. An apparatus according to claim 1, wherein the plurality of channels includes the first channel.

20. A method according to claim 5, wherein the plurality of channels includes the first channel.

* * * * *